US011824696B2

(12) United States Patent
Newman et al.

(10) Patent No.: US 11,824,696 B2
(45) Date of Patent: Nov. 21, 2023

(54) MEASURING AND MITIGATING INTER-SUBCARRIER INTERFERENCE IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 0 days.

(21) Appl. No.: 17/991,069

(22) Filed: Nov. 21, 2022

(65) Prior Publication Data
US 2023/0096827 A1    Mar. 30, 2023

Related U.S. Application Data

(63) Continuation of application No. 17/878,238, filed on Aug. 1, 2022, now Pat. No. 11,522,740, which is a continuation of application No. 17/728,232, filed on Apr. 25, 2022, now Pat. No. 11,463,288.

(60) Provisional application No. 63/329,593, filed on Apr. 11, 2022, provisional application No. 63/327,007, filed on Apr. 4, 2022, provisional application No. 63/327,005, filed on Apr. 4, 2022, provisional application No. 63/321,879, filed on Mar. 21, 2022, provisional application No. 63/313,380, filed on Feb. 24, 2022, provisional application No. 63/272,352, (Continued)

(51) Int. Cl.
*H04L 27/04* (2006.01)
*H04L 27/06* (2006.01)
*H04L 5/00* (2006.01)
*H04W 72/044* (2023.01)

(52) U.S. Cl.
CPC ............ *H04L 27/04* (2013.01); *H04L 5/0051* (2013.01); *H04L 27/06* (2013.01); *H04W 72/044* (2013.01)

(58) Field of Classification Search
None
See application file for complete search history.

(56) References Cited

U.S. PATENT DOCUMENTS

| 11,751,152 B2 * | 9/2023 | Tian | H04L 27/26025 370/503 |
| 2013/0121392 A1 * | 5/2013 | Thompson | H04L 27/2647 375/232 |

(Continued)

*Primary Examiner* — Kodzovi Acolatse

(57) ABSTRACT

Messages are transmitted in closely-spaced subcarriers in 5G and 6G, configured so that each subcarrier signal is orthogonal to the adjacent subcarrier signals. However, many effects can penetrate that orthogonality—distortion, interference, frequency variations, amplitude variations, crosstalk, etc.—collectively termed energy spill-over. To combat this problem, a receiver can determine the total energy spill-over into adjacent subcarriers by measuring a residual signal in a subcarrier with no transmission, adjacent to another subcarrier with a known transmission. The receiver can measure the amplitude, phase, temporal or spectral properties, and so forth of the residual signal. The receiver can then correct the message during signal processing, by calculating a function of the residual signal and subtracting it from each digitized subcarrier signal of a message. This can largely restore the inter-subcarrier orthogonality, improving messaging reliability while avoiding message faults and costly retransmissions.

17 Claims, 4 Drawing Sheets

Related U.S. Application Data filed on Oct. 27, 2021, provisional application No. 63/234,911, filed on Aug. 19, 2021, provisional application No. 63/220,669, filed on Jul. 12, 2021, provisional application No. 63/214,489, filed on Jun. 24, 2021, provisional application No. 63/210,216, filed on Jun. 14, 2021.

(56) References Cited

U.S. PATENT DOCUMENTS

| | | | |
|---|---|---|---|
| 2015/0098440 A1* | 4/2015 | Yang | H04L 5/0051 370/330 |
| 2015/0373694 A1* | 12/2015 | You | H04L 5/0051 370/329 |
| 2016/0277893 A1* | 9/2016 | Katabi | H04W 4/023 |
| 2016/0294523 A1* | 10/2016 | Jeong | H04L 5/0048 |
| 2017/0070377 A1* | 3/2017 | Sawahashi | H04L 27/2602 |
| 2018/0192366 A1* | 7/2018 | Bontu | H04W 52/143 |
| 2018/0332619 A1* | 11/2018 | Manolakos | H04W 74/0825 |
| 2019/0141703 A1* | 5/2019 | Gupta | H04L 5/0051 |
| 2022/0311647 A1* | 9/2022 | Cheng | H04L 27/2675 |
| 2022/0312334 A1* | 9/2022 | Gao | H04W 52/241 |
| 2022/0321383 A1* | 10/2022 | Almquist | H04L 25/0204 |
| 2022/0337461 A1* | 10/2022 | Liu | H04L 5/0094 |
| 2023/0096827 A1* | 3/2023 | Newman | H04L 27/04 370/330 |

* cited by examiner

MEASURING AND MITIGATING INTER-SUBCARRIER INTERFERENCE IN 5G AND 6G

PRIORITY CLAIMS AND RELATED APPLICATIONS

This application is a continuation of U.S. patent application Ser. No. 17/878,238, entitled "Modulation Scheme with Amplitude Variation Within Symbol in 5G/6G", filed Aug. 1, 2022, which is a continuation of U.S. patent application Ser. No. 17/728,232, entitled "Amplitude-Variation Encoding for High-Density 5G/6G Modulation", filed Apr. 25, 2022, which claims the benefit of U.S. Provisional patent application Ser. No. 63/210,216, entitled "Low-Complexity Access and Machine-Type Communication in 5G", filed Jun. 14, 2021, and U.S. Provisional patent application Ser. No. 63/214,489, entitled "Low-Complexity Access and Machine-Type Communication in 5G", filed Jun. 24, 2021, and U.S. Provisional patent application Ser. No. 63/220,669, entitled "Low-Complexity Access and Machine-Type Communication in 5G", filed Jul. 12, 2021, and U.S. Provisional patent application Ser. No. 63/234,911, entitled "Short Demodulation Reference for Improved Reception in 5G", filed Aug. 19, 2021, and U.S. Provisional patent application Ser. No. 63/272,352, entitled "Sidelink V2V, V2X, and Low-Complexity IoT Communications in 5G and 6G", filed Oct. 27, 2021, and U.S. Provisional patent application Ser. No. 63/313,380, entitled "Short-Form 5G/6G Pulse-Amplitude Demodulation References", filed Feb. 24, 2022, and U.S. Provisional patent application Ser. No. 63/321,879, entitled "Low-Complexity Demodulation of 5G and 6G Messages", filed Mar. 21, 2022, and U.S. Provisional patent application Ser. No. 63/327,005, entitled "Recovery and Demodulation of Collided 5G/6G Message Elements", filed Apr. 4, 2022, and U.S. Provisional patent application Ser. No. 63/327,007, entitled "Modulation Including Zero-Power States in 5G and 6G", filed Apr. 4, 2022, and U.S. Provisional patent application Ser. No. 63/329,593, entitled "Amplitude-Variation Encoding for High-Density 5G/6G Modulation", filed Apr. 11, 2022, all of which are hereby incorporated by reference in their entireties.

FIELD OF THE INVENTION

The disclosure pertains to wireless message modulation, and particularly to methods for encoding information in amplitude variations within each modulated resource element of a message.

BACKGROUND OF THE INVENTION

In wireless messaging, the transmission data rate is proportional to the number of bits that can be encoded in each message element. As the number of users expands due to the 5G/6G roll-out worldwide, there will be increasing pressure to make maximum use of the limited bandwidth, yet avoiding congestion and interference due to high-density environments such as urban centers and highly-automated industrial sites. What is needed is means for increasing the information density, or bits per message element, in wireless communications.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a receiver in a wireless network to process signals, the method comprising: receiving a first signal and a second signal, wherein the first signal is in a first resource element of a resource grid and the second signal is in a second resource element of the resource grid, wherein the first and second resource elements occupy adjacent subcarriers at a single symbol-time, wherein the first resource element comprises a demodulation reference, and wherein the second resource element comprises a gap of no transmission; measuring the first signal and determining a first amplitude of the first signal; measuring the second signal and determining a second amplitude of the second signal; and calculating a mitigation according to the first amplitude and the second amplitude.

In another aspect, there is a wireless receiver configured to: receive a demodulation reference comprising a first signal in a first resource element, followed by a second signal in a second resource element, wherein the first signal comprises transmission by a transmitter and the second signal comprises no transmission by the transmitter; measure a first reference amplitude in a first portion of the first resource element, and a second reference amplitude, different from the first reference amplitude, in a second portion of the first resource element; measure a first noise amplitude in a first portion of the second resource element, and a second noise amplitude in a second portion of the second resource element; and determine an amplitude correction factor according to the first and second reference amplitudes and the first and second noise amplitudes.

In another aspect, there is non-transitory computer-readable media in a wireless transmitter, the media containing instructions that when implemented in a computing environment cause a method to be performed, the method comprising: transmitting a first demodulation reference and a message, wherein: the first demodulation reference is concatenated with a start of the message; the message and the first demodulation reference are modulated according to a modulation scheme comprising amplitude modulation; the amplitude modulation is according to a plurality of predetermined amplitude levels comprising a maximum amplitude level; the first demodulation reference comprises two demodulation resource elements; and one of the demodulation resource elements comprises the maximum amplitude level of the plurality of predetermined amplitude levels, and the other demodulation resource element comprises zero transmission.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
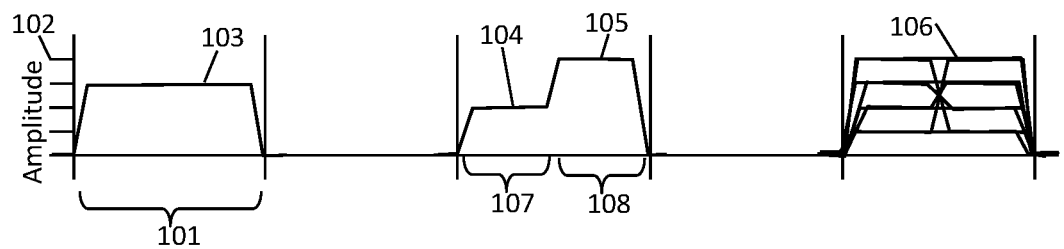
FIG. 1A is a schematic showing an exemplary embodiment of message elements with stepwise amplitude variations in classical amplitude-phase modulation, according to some embodiments.

Systems and methods disclosed herein (the "systems" and "methods", also occasionally termed "embodiments" or "arrangements" or "versions", generally according to present principles) can provide urgently needed wireless communication protocols for transmitting messages with information encoded in an amplitude variation within each message element, as opposed to prior-art modulation in which the amplitude remains constant during the message element. Such amplitude-variation encoding multiplies the number of modulation states available for each message element, which thereby conveys additional data in the same amount of time and transmitted power. For example, the amplitude may be switched from one modulation level to another modulation level in the middle of the symbol-time, and the receiver can detect the amplitude change by digital filtering configured to be sensitive to such amplitude switching in the middle of the symbol-time. In some embodiments, the amplitude switch may also include a change of sign, further multiplying the number of modulation states available for carrying information. In some embodiments, the amplitude change may be a continuous and linear ramped variation of the amplitude, thereby varying throughout the symbol-time instead of switching at the middle. Ramped amplitude variations can provide even more possible encoding states for compactly conveying information. When the amplitude variation causes sidebands or a net frequency shift, such distortions can be largely negated by slightly adjusting the transmitted frequency, and other steps. Versions applicable to classical amplitude-phase modulation are disclosed, as well as pulse-amplitude modulation versions. Specialized demodulation reference configurations are provided, exhibiting amplitude-variation states that enable mitigation of the frequency distortions as mentioned. Wireless messaging, by including amplitude-variation encoding, may thereby enable more data to be transmitted in less time and less energy consumption, and with less background generation, than prior-art static amplitude transmissions. Encoding extra information in certain predetermined amplitude variations may thereby result in higher information density in communications, shorter messages for the same content, lower latency, and improved network performance generally, according to some embodiments.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "sub-channel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "PAM" (pulse-amplitude modulation) refers to separately amplitude-modulating two signals and then adding them with a 90-degree phase shift. The two signals may be called the "I" and "Q" branch signals (for In-phase and Quadrature-phase) or "real and imaginary" among others. A "modulation scheme" generally includes a plurality of modulation states, each modulation state including one or more predetermined amplitude levels and/or phase levels. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. For example, 16QAM modulated according to PAM exhibits two phase levels at zero and 90 degrees (or in practice, for carrier suppression, ±45 degrees) and four amplitude levels including two positive and two negative, thus forming 16 distinct modulation states. For comparison, classical amplitude-phase modulation in 16QAM includes four positive amplitude levels and four phases of the raw signal, which are multiplexed to produce the 16 states of the modulation scheme. In addition, the extremely legacy "on-off" modulation refers to transmitting message bits with amplitude modulation in which one state has zero transmission. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-checking code. "RNTI" (radio network temporary identity) is a network-assigned user code. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal. A "sum-signal" is a waveform including the combined signals from a plurality of separately modulated subcarriers.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" that exhibit levels of a modulation scheme (as opposed to conveying data). Thus integer Nref is the number of reference resource elements in the demodulation reference. A "calibration set" is one or more amplitude values (and optionally phase values), which have been determined according to a demodulation reference, representing the predetermined modulation levels of a modulation scheme. Generally the modulation scheme includes integer Nlevel predetermined amplitude or phase levels. A "short-form demodulation reference" is a compact demodulation reference exhibiting, generally, the maximum and minimum amplitude or phase levels of a polarization scheme so that the receiver can calculate other levels by interpolation. A "amplitude-variation demodulation reference" is a demodulation reference that exhibits maximum and minimum amplitude or phase levels as well as one or more amplitude-variation states for each polarization component separately. "Spill-over" includes signal transmitted in one subcarrier but received in another subcarrier, due to sidebands, distortion, non-orthogonality, or other process. A "frequency-spanning" message occupies multiple subcarriers in a single symbol-time. A "time-spanning" message occupies multiple symbol-times at a single subcarrier.

Turning now to the figures, in a first example, amplitude-variation waveforms are disclosed in which the amplitude "switches" or changes in a stepwise manner, in the middle of the symbol-time.

FIG. 1A is a schematic showing an exemplary embodiment of message elements with stepwise amplitude variations in classical amplitude-phase modulation, according to some embodiments. As depicted in this non-limiting example, the amplitudes of certain waveforms are sketched, as in an oscilloscope display of wireless message element signals, with the RF oscillations suppressed. Time is horizontal, divided into symbol-times 101, and the amplitude is indicated vertically 102 in arbitrary amplitude "units" demarked by ticks. In this case, there are four amplitude levels representing 1, 2, 3, and 4 amplitude units, although the principles may be applicable to modulation schemes with any number of amplitude levels.

A first message element 103 is modulated without amplitude-variation, that is, with a constant amplitude of 3 units for the duration of the symbol-time. A second message element 104, 105 is modulated with amplitude-variation, as indicated by a first portion 104 of the symbol-time modulated according to a first amplitude of 2 units, followed by a second portion 105 with an amplitude of 4 units, all within a single symbol-time. Thus the amplitude modulation varies from the first level to the second level during the symbol-time. The transition between the two amplitude portions 104, 105 may or may not be abrupt, depending on the properties of the transmitter. In either case, the amplitude is said to "switch" between the two amplitude values 104, 105, and the state may be termed "switched amplitude-variation modulation" (as opposed to a "ramped amplitude-variation modulation" described below). The receiver can receive the amplitude-variation message element, measure the first amplitude 104 during the first half 107 of the symbol-time, and then measure the second amplitude 105 during the second half 108 of the symbol-time, and thereby determine the amplitude-variation modulation state of the message element. Additional information is thereby encoded in the difference between the first and second 104, 105 amplitude values. Message elements including amplitude-variation can thereby convey information that is not present in the constant-amplitude version 103.

A third message element 106 shows a variety of amplitude-variation waveforms all superposed, as in an oscilloscope display with multiple traces accumulated on-screen. The display shows that varying the transmitted amplitude from a first value to a second value during the symbol-time thereby provides a large number of additional modulation states, which are not present in modulation schemes that provide only constant-amplitude states. For example, in a modulation scheme with four levels of amplitude modulation as shown, such as 16QAM with classical amplitude-phase modulation, the number of states with constant amplitude is 16 (that is, 4 amplitude levels multiplexed with 4 phase levels). If amplitude-variation is added, the number of additional states with amplitude-variation is 12×4=48 (that is, 12 additional amplitude-variation states multiplexed with 4 phase levels). When added to the 16 constant-amplitude states, the total number of modulation states is 64 modulation states in the amplitude-variation modulation scheme. The number of bits per message element is related to the number of modulation states in the modulation scheme. More specifically, the number of bits per message element Nbits is related to the number Nstates of modulation states in the modulation scheme by Nbits=$\log_2$(Nstates). 16QAM without amplitude-variation encodes 4 bits per message element in 16 constant-amplitude modulation states of prior art. In contrast, 16QAM with amplitude-variation ("16QAM+AV") provides 64 distinct states, thereby encoding 6 bits per message element. Hence a message that occupied 30 resource elements in prior-art 16QAM, would now require only 20 resource elements with amplitude-variation, due to the increased information density in the amplitude-variation modulation scheme. The same ratio of message lengths is found for other amplitude-modulated schemes. For example 256QAM normally encodes 8 bits per message element in constant-amplitude states of prior art; but with amplitude-variation, the additional states can encode 12 bits per message element using switched amplitude-variation, and can thus provide proportional savings in time and energy. Messages transmitted with amplitude-variation can be 33% shorter than the same messages would be, absent amplitude-variation, according to some embodiments.

Subcarrier orthogonality is an important feature of wireless messages, because orthogonality enables the receiver to separate and demodulate the closely-spaced adjacent subcarriers. However, changing the amplitude in the middle of the symbol-time can create sidebands in which the transmitted signal additionally deposits amplitude or energy into adjacent subcarriers, thereby partially reducing the orthogonality. For example, if the amplitude is switched from a first level to a second level during the symbol-time, the received waveform is equivalent to a superposition of two signals, one at a constant amplitude and the other signal suddenly switching between positive and negative values. The constant-amplitude portion is equal to the average of the first and second amplitudes, while the amplitude of the switched component is one-half the difference between the first and second amplitude levels. The sidebands and signal intrusion are due to the switched portion only. However, the receiver can mitigate such distortions because the amount of energy generated in adjacent subcarriers is a deterministic function of the polarity-switching portion. The receiver can therefore calculate the amount of signal spill-over and distortion in the adjacent subcarriers, and can subtract the calculated effects, thereby largely canceling the non-orthogonality caused by the amplitude variation.

Frequency control is another important feature. When the amplitude is varied during the symbol-time, the frequency of the received wave may be shifted slightly from the subcarrier frequency value. However, the transmitter can mitigate such frequency shifts, if small, by slightly adjusting the transmitted frequency of the modulated subcarrier. For example, if the amplitude changes sign during the symbol-time, then the received signal appears to have an extra wavelength in the symbol-time, and therefore a higher or lower frequency. The transmitter can negate that frequency shift by calculating and subtracting the frequency shift from the transmitted frequency, and thereby largely compensate the frequency shift caused by the switched component. In effect, the transmitter can bring the sideband within the bandwidth of the subcarrier, or at least can minimize the remaining energy in the adjacent subcarriers. By these mitigation steps, the receiver and transmitter can minimize distortion of the adjacent subcarrier signals due to the amplitude-variation, according to some embodiments.

Figure 1B:
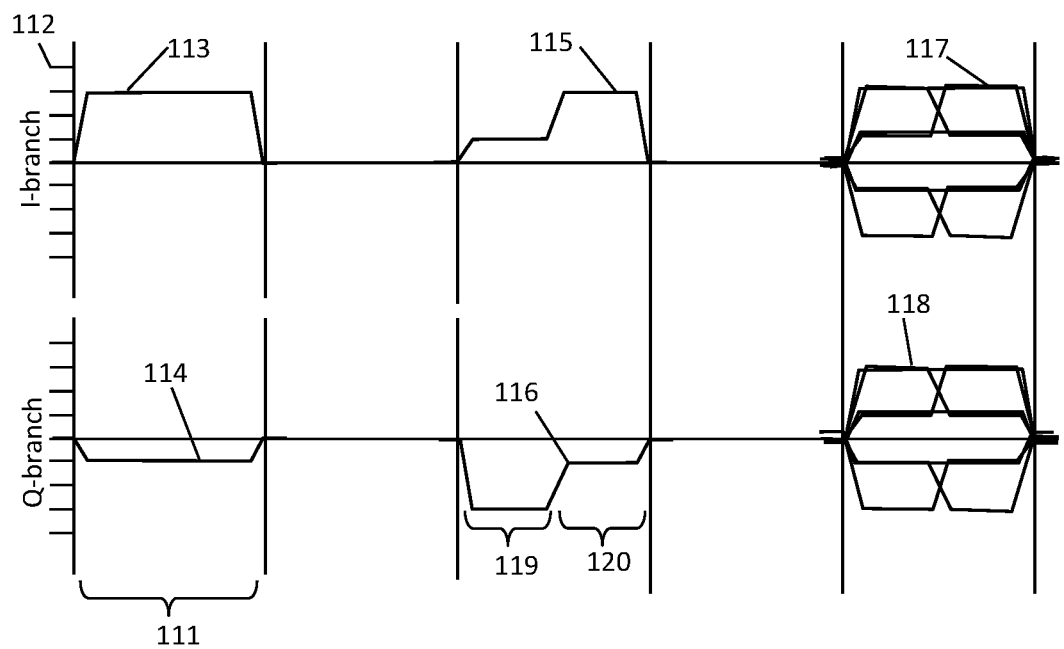
FIG. 1B is a schematic showing an exemplary embodiment of message elements with stepwise amplitude variations in pulse-amplitude modulation, according to some embodiments.

FIG. 1B is a schematic showing an exemplary embodiment of message elements with stepwise amplitude-variations, modulated in PAM pulse-amplitude modulation, according to some embodiments. As depicted in this non-limiting example, the amplitudes of certain waveforms are sketched, as in an oscilloscope display, of a wireless message element signal, with the RF oscillations suppressed but preserving the sign of the amplitude. In this case, the message is modulated in 16QAM with pulse-amplitude modulation or PAM, including an I-branch signal added to a phase-shifted Q-branch signal, with separate modulations for each branch in each message element. The amplitude of each branch can be switched from a first level to a second level during the symbol-time, encoding additional information. In this example, the branch amplitudes are switched without changing the sign of the amplitude, in order to minimize frequency distortions. (Other examples, discussed later, include sign-changing amplitude-variations.)

Three message elements are shown, separated into an I-branch and a Q-branch as labeled on the left side. Each branch is modulated according to four levels, which in this case are −3, −1, +1, and +3 amplitude units, corresponding to 16QAM with pulse-amplitude modulation. The amplitude levels are indicated by ticks 112. A first message element has a +3 amplitude in the I-branch 113 and a −1 amplitude in the Q-branch 114 throughout the symbol-time 111. In this case, the first message element is not amplitude switched.

A second message element has an I-branch amplitude variation 115 switching from +1 to +3 units, and a Q-branch amplitude variation 116 switching from −3 to −1 units. The receiver can measure the amplitudes before and after the switch, as indicated during the first half 119 and the second half 120 of the symbol-time. The receiver can thereby determine the modulation state of the message element according to the two amplitude levels of the two branches. The receiver can also calculate the (usually small) spill-over into adjacent subcarriers due to the amplitude changes, and can correct for them in analysis.

After determining the first and second amplitude values, the receiver can demodulate the message element by comparing those amplitude values to a calibration set that includes the various amplitude levels of the modulation scheme, as provided by a demodulation reference proximate to the message. For example, the receiver can compare the observed amplitude values in the received message element to the predetermined amplitude levels in the calibration set, and thereby determine which modulation state is represented by the message element. In addition, the receiver can assign, to each of the modulation levels, a code or number, and can then concatenate the codes or numbers associated with the modulation levels of each received message element, thereby demodulating the message. The receiver can then provide those codes or numbers to a processor configured to interpret the message. Alternatively, the receiver can assign a code or number to each of the modulation states of the modulation scheme, and can determine which code or number corresponds to the message element according to the determined modulation state of the message element. The receiver can then provide that code or number to the interpretation processor, thereby demodulating the message. For example, the modulation scheme may include at least one modulation state in which the amplitude is varied, either step-wise or linearly ramped, from a first to a second amplitude level, and a particular code or number can be assigned to that amplitude-varied modulation state. Likewise, the demodulation reference can include at least one demodulation reference element exhibiting a stepped or ramped amplitude-variation state.

In some embodiments, the transmitter can correct for sideband generation by slightly adjusting the transmitted frequency of the switched-amplitude signal, further minimizing unwanted distortions, according to some embodiments. Since the frequency shift caused by the amplitude-variation is dependent on the sign of the amplitude change, the frequency shift may be opposite for the two branches, as in the depicted case. Therefore, the transmitter can adjust the I-branch frequency according to the amplitude-variation in the I-branch phase, and separately adjust the Q-branch frequency according to the amplitude-variation in the Q-branch phase, and thereby mitigate frequency shifts in both branches, before transmission.

A third message element is shown as a composite of multiple waveforms on the I-branch 117 and Q-branch 118, some with amplitude variation and some without amplitude variation. The amplitude variations may be between the +1 and +3 levels, or between the −1 and −3 levels. Each branch has 8 distinct modulation states (4 for positive amplitudes and 4 for negative, each branch). Multiplexing the two branches, the number of states is then 8×8=64 modulation states in the depicted amplitude-variation modulation scheme (that is, without reversing the sign of the amplitude). This 64 is the same number of states as 16QAM+AV with classical amplitude-phase modulation plus amplitude-variation, as shown in the previous example. Accordingly, a message modulated in PAM with amplitude-variation (but not sign-changing) can be 33% shorter than the same message modulated without amplitude-variation, according to some embodiments.

Figure 1C:
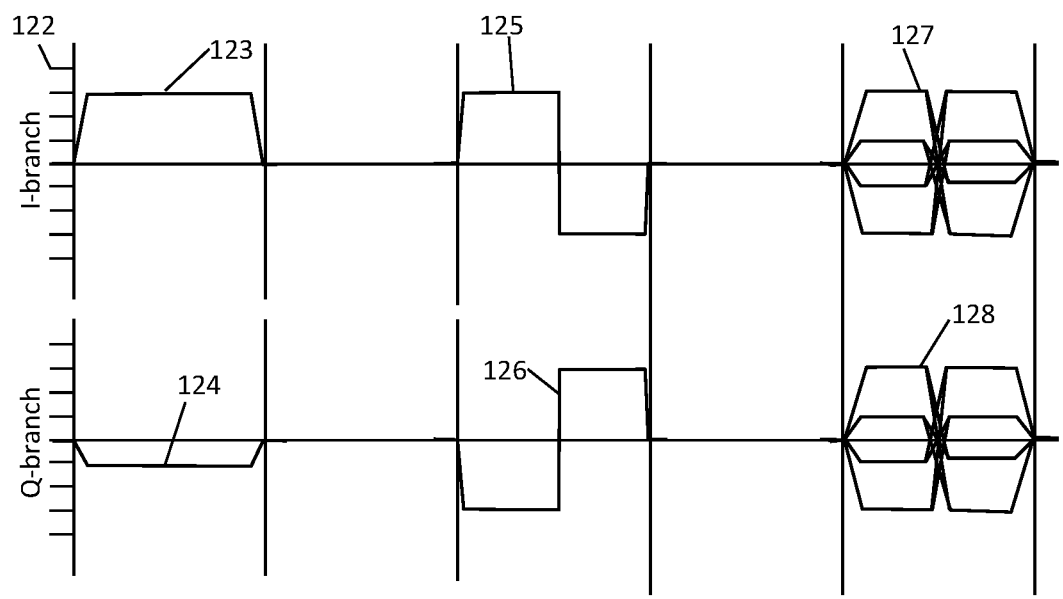
FIG. 1C is a schematic showing an exemplary embodiment of message elements with stepwise amplitude variations in pulse-amplitude modulation with sign reversal, according to some embodiments.

FIG. 1C is a schematic showing an exemplary embodiment of message elements with stepwise amplitude variations in pulse-amplitude modulation, but now with sign reversal of the amplitude, according to some embodiments. As depicted in this non-limiting example, the amplitudes of certain waveforms are sketched, as in an oscilloscope display of a wireless message element signal with the RF oscillations suppressed, and subcarriers marked as 122. In this example, the amplitude-variation may include a sign change when the amplitude is switched between the first and second halves of the symbol-time. Sign reversal of the amplitude is equivalent to a 180-degree phase change. With sign reversal now permitted, many additional modulation states are provided.

A first message element 123 includes a constant-amplitude modulation on the I-branch and likewise 124 on the Q-branch. A second message element 125, 126 includes amplitude-variation with sign reversal, switching from the +3 amplitude level to the −3 level on the I-branch, and −3 to +3 on the Q-branch. The amplitude change occurs in the middle of the symbol-time, now abruptly (in a short period of time or zero time) as opposed to the transitions between levels as depicted in the other examples. A third message element 127, 128 shows a cluster of amplitude variations overlapping, with various amplitude switches, including sign reversal.

Allowing the amplitude variations to include sign-changing variations further increases the number of modulation states available. In the depicted case of 16QAM, the 16 constant-amplitude states of prior-art 16QAM, and the amplitude-variation states of the previous example, are now augmented further by the sign-reversal states, which bring the total number of modulation states to 256. Each branch has 4 possible amplitude levels for the first half of the symbol-time, and 4 levels for the second half, totaling 4×4=16 possible amplitude shapes per branch. The two branches are then multiplexed to give 16×16=256 modulation states in all. This represents 8 bits per message element, as opposed to 4 bits per message element, absent the amplitude-variation. Therefore each message may be 50% shorter than the same message modulated in prior-art 16QAM, by exploiting the many extra states enabled by amplitude-variation, according to some embodiments.

However, the sign reversal can substantially increase the sideband generation, as well as the frequency shift and energy spill-over into adjacent subcarriers. The sideband distortions can be calculated by the receiver based on the size and direction of the amplitude change, and the frequency shift can be mitigated by the transmitter by adjusting the frequency of each subcarrier and branch signal, slightly up or down to account for the frequency-shifting effect of the amplitude sign change. With these mitigations, the receiver may separately measure the first and second amplitude levels, before and after the switch, and can subtract the expected subcarrier contamination of each branch of each adjacent subcarrier signal, thereby largely restoring orthogonality, according to some embodiments.

Figure 2A:
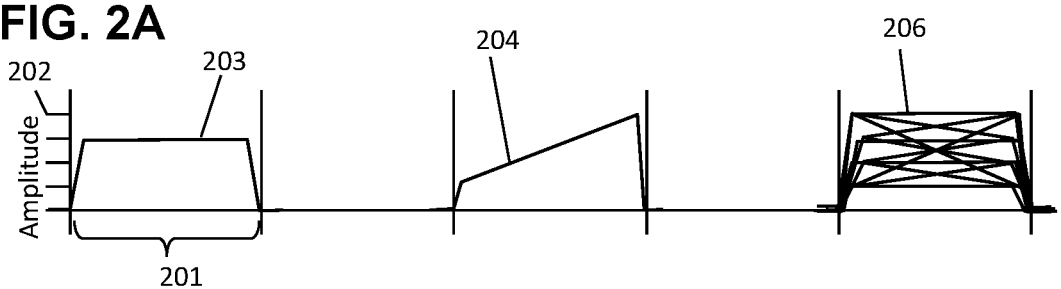
FIG. 2A is a schematic showing an exemplary embodiment of message elements with ramped amplitude variations in classical amplitude-phase modulation, according to some embodiments.

FIG. 2A is a schematic showing an exemplary embodiment of message elements with linear ramped or "sloping" amplitude-variations, using classical amplitude-phase modulation, according to some embodiments. As depicted in this non-limiting example, the amplitudes of certain waveforms are sketched, as in an oscilloscope display of a rectified wireless message element signal. In this example, the amplitude variation is "sloping", or linearly varying from a first amplitude level to a second amplitude level during the symbol-time. As before, symbol-times 201 are shown horizontally and subcarriers 202 vertically. There are 4 positive amplitude levels, as in 16QAM with classical amplitude-phase modulation.

A first message element 203 is shown with a constant amplitude at 3 units, not amplitude-varying. A second message element 204 has a linearly increasing amplitude from 1 to 4 amplitude units. A third message element 206 is a composite of many possible modulation states with ramped amplitude-variation. The number of modulation states is increased from 16 prior-art constant-amplitude states, increased to 64 states by the addition of ramped amplitude-variation. The ramped-amplitude variations provide the same number of modulation states, 64, as the switched-amplitude variations of example FIG. 1A, and therefore encode the same number, 6, bits per message element. A message can therefore be 33% shorter with the additional ramped-amplitude modulation states than with constant-amplitude states only. The receiver can digitize the signal by repeatedly measuring the amplitude during reception, such as with an ADC, and then fit the resulting waveform to a linearly varying amplitude in each subcarrier, and can thereby detect the slope as well as the initial and final amplitude levels. The receiver can thereby determine the modulation state of each message element according to the ramped amplitude-variation between those two amplitude levels. As mentioned, the transmitter can slightly adjust the transmitted frequency, based on the size of the amplitude variation, to mitigate frequency distortions, and the receiver can calculate and mitigate the remaining sideband amplitude (and phase) according to the rate of change of the amplitude. The transmitter and receiver can thereby cooperate to correct distortions in the adjacent subcarriers, and thereby correctly demodulate the message elements, according to some embodiments.

Figure 2B:
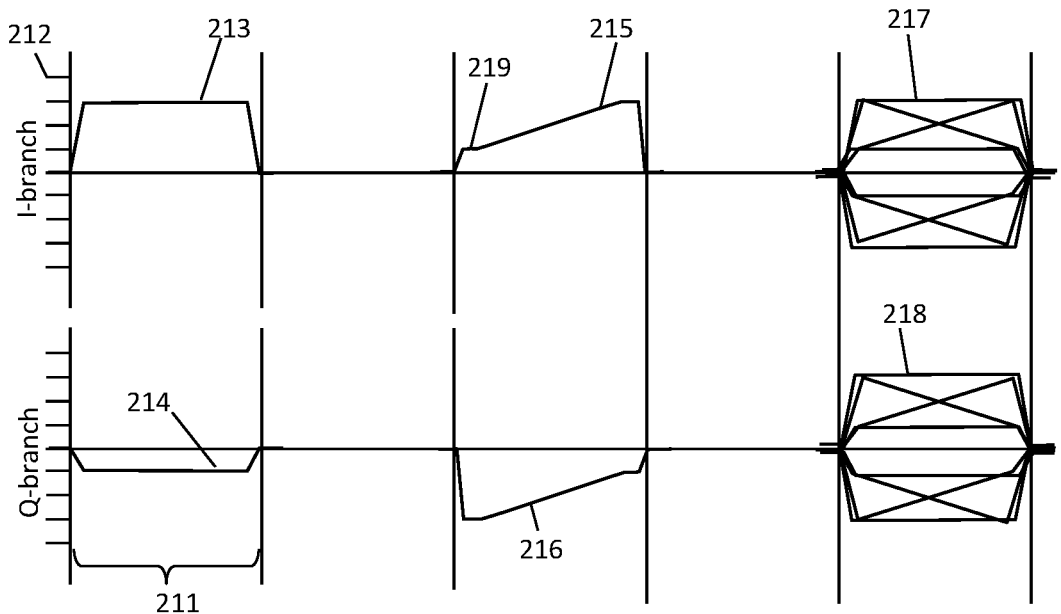
FIG. 2B is a schematic showing an exemplary embodiment of message elements with ramped amplitude variations in pulse-amplitude modulation, according to some embodiments.

FIG. 2B is a schematic showing an exemplary embodiment of message elements with ramped amplitude variations in pulse-amplitude modulation, according to some embodiments. As depicted in this non-limiting example, the amplitudes of certain waveforms are sketched, as in an oscilloscope display of a wireless message element signal with the RF oscillations suppressed but the amplitude sign preserved, with amplitude levels shown by ticks 212. In a first symbol-time 211 a message element with a constant I-branch amplitude 213 and a constant Q-branch amplitude 214 is shown. In a second message element, the I-branch amplitude 215 is ramped from +1 to +3 units, while the Q-branch amplitude 216 is ramped from −3 to −1 unit. In this example, the ramped amplitude variation includes a short "plateau" such as 219, at the starting and ending amplitude levels, to assist the receiver in determining the two amplitude levels involved. The receiver can measure the rate of change of amplitude in the two branches and thereby determine the modulation state. In this case, the modulation scheme has four amplitude levels at −3, −1, +1, and +3 amplitude units, such as 16QAM, but now with the addition of the ramped-amplitude modulation states.

A third message element shows a composite of multiple ramped-amplitude and constant-amplitude modulation states in the I-branch 217 and Q-branch 218, but without sign reversal. The number of states in the modulation scheme is again 64, representing 6 bits per message element, and therefore a 33% improvement in message size with ramped-amplitude states, according to some embodiments.

Figure 2C:
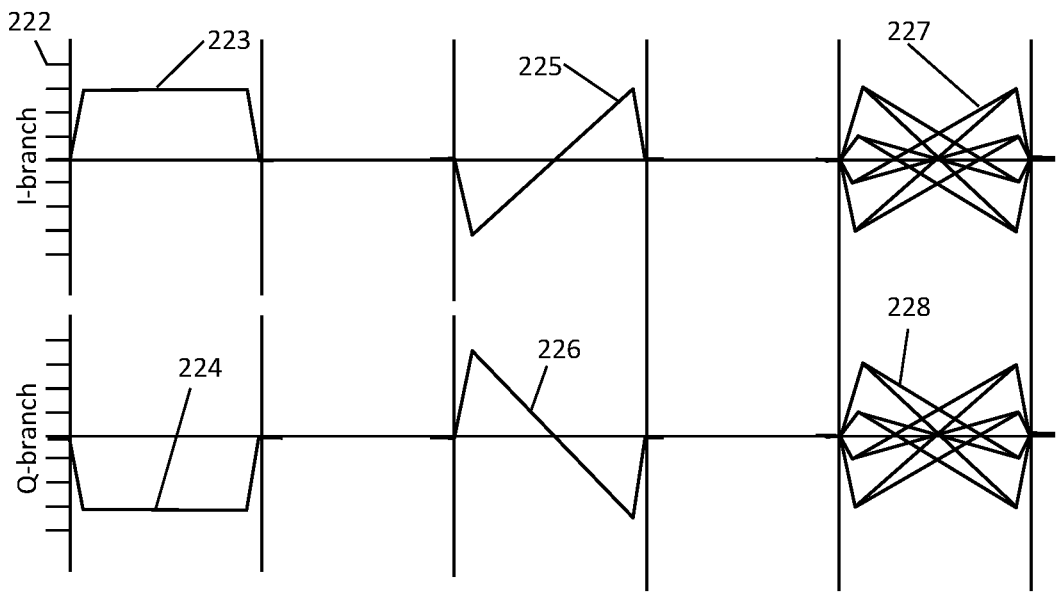
FIG. 2C is a schematic showing an exemplary embodiment of message elements with ramped amplitude variations in pulse-amplitude modulation with sign reversal, according to some embodiments.

FIG. 2C is a schematic showing an exemplary embodiment of message elements with ramped amplitude variations in pulse-amplitude modulation with sign reversal, according to some embodiments. As depicted in this non-limiting example, the amplitudes of certain waveforms are sketched, as in an oscilloscope display of a wireless message element signal. In this case, the ramped amplitude variation is permitted to cross between positive and negative signs (equivalent to a 180-degree phase change), thereby providing additional modulation states.

A first message element 223 has a constant amplitude of +3 units in the I-branch and a constant amplitude of −3 units in the Q-branch 224. A second message element 225, 226 has a ramped amplitude-variation between −3 and +3 units in both branches. A third message element 227, 228 shows a number of modulation states superposed.

The basic amplitude levels of the modulation scheme are again −3, −1, +1, and +3 amplitude units 222, as in 16QAM, but with the addition of states having ramped amplitude-variation including sign reversal. The number of variations is increased to 256, thereby encoding 8 bits per message element. Accordingly, messages may be half as long relative to priori-art 16QAM, while carrying the same content. The ramped amplitude-variation modulation states can increase the network throughput by a factor of 2, with no increase in transmission power or background generation, according to some embodiments.

Figure 3:
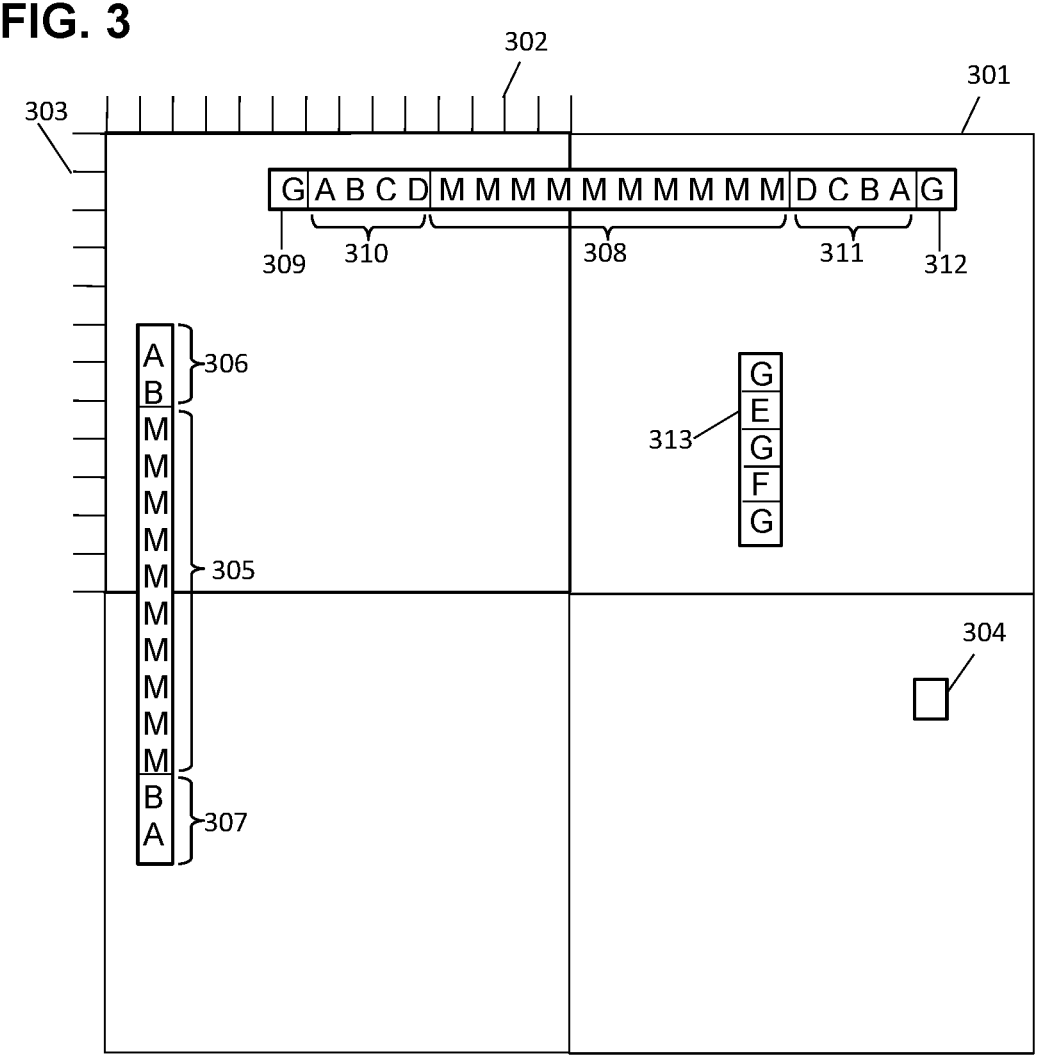
FIG. 3 is a schematic showing an exemplary embodiment of a resource grid with messages modulated in amplitude-variation modulation, according to some embodiments.

FIG. 3 is a schematic showing an exemplary embodiment of a resource grid with messages modulated in amplitude-variation modulation, according to some embodiments. As depicted in this non-limiting example, a resource grid 301 includes two slots demarked in symbol-times 302 and two resource blocks demarked in subcarriers 303. An isolated resource element 304 is shown. A first message 305 is frequency-spanning, in multiple subcarriers at a single symbol-time, and is preceded by a first demodulation reference 305 and followed by a second demodulation reference 307. The message elements are indicated by "M" and the reference elements by "A" and "B". For example, the demodulation references may be two-point short-form demodulation references in which the A represents a resource element modulated according to the maximum amplitude level (and optionally the maximum phase level) of the modulation scheme, while the B represents a resource element modulated according to the minimum amplitude level (or phase) of the modulation scheme. The receiver can calculate the intermediate levels, if any, by interpolation. The receiver can also largely mitigate noise and interference by demodulating the message elements according to the modulation levels exhibited in the demodulation references 306, 307. The order of states is different for the first and second demodulation references 306, 307, thereby assisting the receiver in identifying the start and end of the message 305.

The figure also includes a time-spanning message 308 occupying a single subcarrier and multiple symbol-times. This message 308 proceeds uninterrupted through the slot boundary. In other cases, the message 308 may be interrupted and continue after one or more symbol-times reserved for control or other purposes. The message is preceded by a gap G 309 and a leading demodulation reference ABCD 310, and is trailed by another demodulation reference DCBA 311 and a final gap 312. The gaps 309, 312 are resource elements with no transmission, indicating the start and end of the demodulation references 310, 311. The demodulation references 310, 311 may be four-point short-form demodulation references exhibiting the maximum and minimum amplitudes (and optionally phases) of the modulation scheme as A and B, then certain amplitude-variation states as C and D. For example, the C state may be a switched-amplitude or ramped-amplitude state extending from the maximum to the minimum amplitude level, and the D state may be the same but extending from the minimum to the maximum amplitude level. The receiver can receive the demodulation references 310, 311 and measure the amplitude levels exhibited therein, calculate intermediate levels, and store them in a calibration set for subsequent demodulation of the message elements. In addition, the receiver can measure the amplitude-variation states C and D, further calibrate the response to a non-constant amplitude, check for sidebands, adjust the calculated mitigation, and check the transmitter-side frequency adaptation to minimize distortions of adjacent subcarriers.

The figure also shows a modified frequency-spanning demodulation reference 313 configured to determine how much signal appears in adjacent subcarriers due to the amplitude variation. In this case, two demodulation reference elements (E and F) with large amplitude-variation signals, are surrounded by gaps (G) with no transmission. For example, the E reference element may have a switched or ramped amplitude-variation from the lowest amplitude level of the modulation scheme to the highest amplitude level, and the F reference element may have a switched or ramped amplitude-variation from the highest to the lowest level. Any signal appearing in the gaps may then be attributed to sidebands and other distortions spilling over from the amplitude-variation reference elements. The receiver can measure the signal present in each gap subcarrier, determine how much spill-over is present from all causes, and thereby measure how much correction is needed to mitigate sidebands and other distortions caused by the amplitude-variation reference elements E and F. Hence, the receiver can use the demodulation references 310, 311, 313 to monitor subcarrier orthogonality and distortions, and mitigate them, as well as updating the modulation levels in the calibration set, according to some embodiments.

Figure 4A:
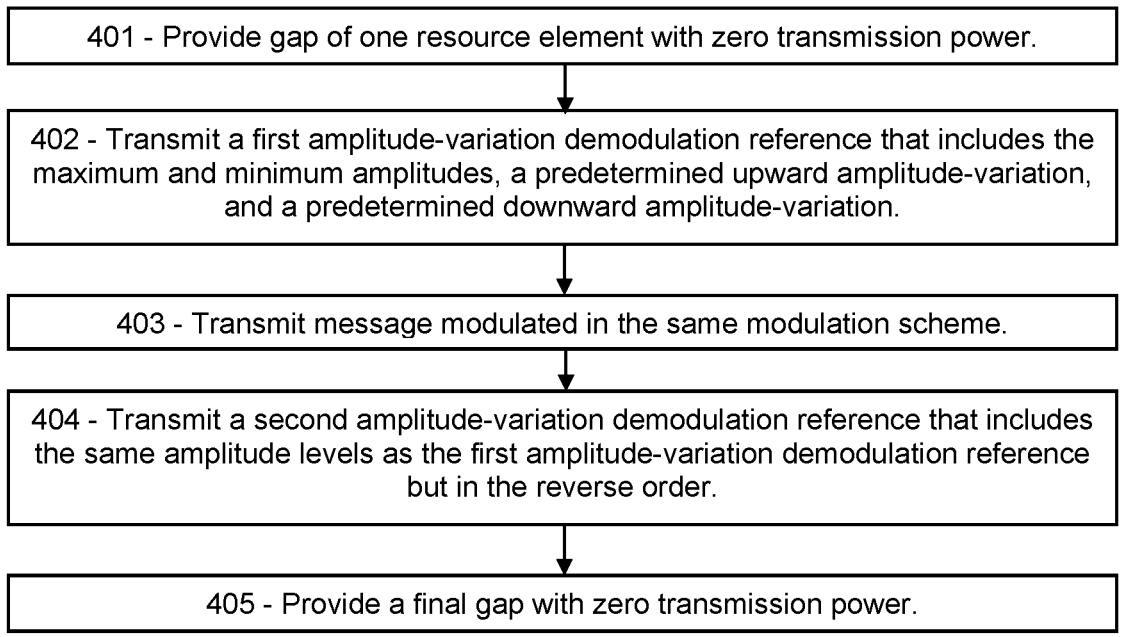
FIG. 4A is a flowchart showing an exemplary embodiment of a procedure for transmitting a message modulated in amplitude-variation modulation, according to some embodiments.

FIG. 4A is a flowchart showing an exemplary embodiment of a procedure for transmitting a message modulated in amplitude-variation modulation, according to some embodiments. As depicted in this non-limiting example, at 401 a transmitter provides a gap of one resource element with no transmission in one symbol-time and one subcarrier frequency. The gap is followed at 402 by a demodulation reference including amplitude-variation features. The demodulation reference may be a short-form demodulation reference that exhibits the maximum and minimum amplitude levels of the modulation scheme, so that the receiver can calculate the intermediate levels, if any, by interpolation. The demodulation reference can also exhibit phase levels, if phase is modulated, such as the maximum and minimum phase levels, of the modulation scheme. If the modulation scheme is PAM, the demodulation reference may exhibit the maximum and minimum amplitude values for each branch separately, thereby allowing the receiver to determine the amplitude levels separately for the 0 and 90 degree phase states. If the modulation scheme includes either switched-amplitude or ramped-amplitude variations, then the demodulation reference can include examples of those as well as the static amplitude levels. Based on the demodulation reference and the modulation levels exhibited therein, the receiver can determine the values needed to identify the modulation states of each message element and mitigate remaining distortions, if any.

At 403, the transmitter transmits the message, modulated in the same modulation scheme. Optionally, the transmitter may adjust the frequency of each subcarrier to counteract the frequency effects of amplitude-variation, and minimize or correct for the spill-over into adjacent subcarriers. At 404, the transmitter transmits another demodulation reference, thereby revealing any changes in noise or interference between the start and end of the message, and a final gap of silence at 405.

Figure 4B:
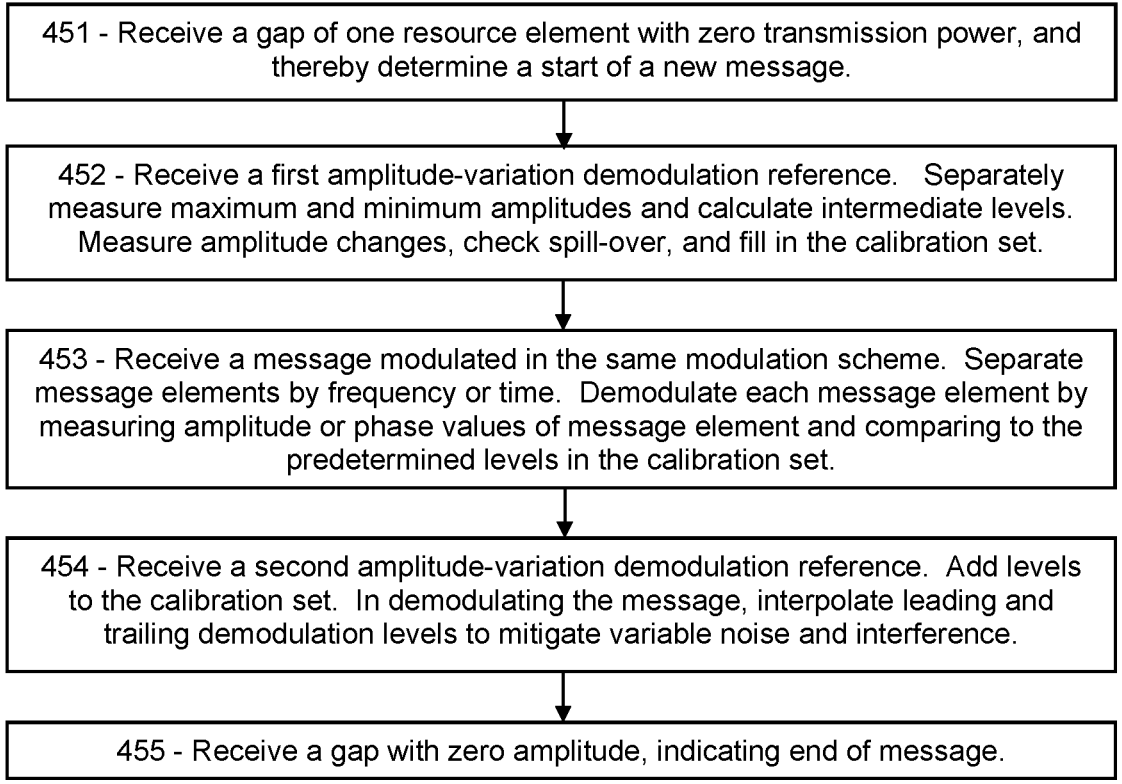
FIG. 4B is a flowchart showing an exemplary embodiment of a procedure for receiving a message modulated in amplitude-variation modulation, according to some embodiments.

FIG. 4B is a flowchart showing an exemplary embodiment of a procedure for receiving a message modulated in amplitude-variation modulation, according to some embodiments. As depicted in this non-limiting example, at 451 a receiver receives a resource element of zero amplitude and determines that a new message is following. At 452, the receiver receives a demodulation reference exhibiting the amplitude levels, and optionally the phase levels, of the modulation scheme, and calculates intermediate levels if any, and populates the calibration set for subsequent demodulation of the message. The receiver also calculates the expected distortion of adjacent subcarrier signals due to the amplitude-variation and prepares to mitigate those effects.

At 453, the receiver receives the message elements. By analog or digital electronic means, the receiver separates each subcarrier signal (for frequency-spanning messages), or each symbol-time (for time-spanning messages). The receiver then measures the amplitude levels and the amplitude variations in each message element, and compares to the modulation levels previously stored in the calibration set to demodulate the message.

At 454, the receiver receives the final demodulation reference and at 455 the final gap. In some embodiments, the receiver waits to demodulate the message until having received and processed both demodulation references, and can thereby mitigate a frequency-dependent or time-dependent interference. For example, the receiver can calculate a weighted-average calibration set for each message element by interpolating between the leading and trailing calibration levels according to the distances of the message element from each of the demodulation references.

The disclosed systems and methods, implemented in certain embodiments, can thereby provide modulation schemes with more modulation states and higher bits per message element than prior-art modulation schemes, and can thereby provide improved information density in communications, reduced latency, and improved network operation overall, according to some embodiments. Message elements may be modulated according to amplitude-variation at the middle of the symbol-time of each message element, according to the switched-amplitude or ramped-amplitude examples disclosed, thereby providing an expanded modulation scheme that includes many additional modulation states. The transmitter can therefore provide substantially increased bits per message element, and hence shorter message transmissions. Shorter messages may result in a lower traffic density at the same throughput, and therefore less background generation, and less energy expense in both transmitting and receiving the messages, than prior-art modulation schemes that lack amplitude-variation, according to some embodiments.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a receiver in a wireless network to process signals, the method comprising:
 a) receiving a first signal and a second signal, wherein the first signal is in a first resource element of a resource grid and the second signal is in a second resource element of the resource grid, wherein the first and second resource elements occupy adjacent subcarriers at a single symbol-time, wherein the first resource element comprises a demodulation reference, and wherein the second resource element comprises a gap of no transmission;
 b) measuring the first signal and determining a first amplitude of the first signal;
 c) measuring the second signal and determining a second amplitude of the second signal;
 d) calculating a mitigation according to the first amplitude and the second amplitude;
 e) determining, according to the first signal, a maximum amplitude level of a modulation scheme, wherein the modulation scheme comprises a plurality of predetermined amplitude levels; and
 f) calculating, according to the maximum amplitude level and the mitigation, at least one additional amplitude level of the modulation scheme.

2. The method of claim 1, wherein the first signal is received according to 5G or 6G technology.

3. The method of claim 1, wherein:
 a) the first signal is configured according to a modulation scheme comprising amplitude modulation, wherein the amplitude modulation comprises two or more predetermined amplitude levels, wherein the predetermined amplitude levels comprise a maximum positive amplitude level; and
 b) the first signal is modulated according to the maximum positive amplitude level.

4. The method of claim 3, wherein:
 a) the predetermined amplitude levels further comprise negative amplitude levels including a maximally negative amplitude level; and
 b) the method further comprises:
  i) receiving a third resource element comprising a third signal, the third signal modulated according to the maximally negative amplitude level; and
  ii) calculating, by interpolating between the maximum positive amplitude level and the maximally negative amplitude level, at least one intermediate amplitude level.

5. The method of claim 4, further comprising:
 a) receiving a fourth resource element comprising a fourth signal, wherein the fourth resource element occupies a subcarrier adjacent to the third resource element, and wherein no transmission is transmitted in the fourth resource element;
 b) determining, according to the fourth signal, an amount of inter-subcarrier crosstalk according to a difference between the second and fourth signals.

6. The method of claim 1, wherein:
 a) the first and second resource elements are concatenated with a start of a message.

7. The method of claim 6, further comprising:
 a) receiving a third resource element comprising no transmission therein and a fourth resource element modulated according to the first amplitude, wherein the third resource element is concatenated with an end of the message and the fourth resource element is concatenated with the third resource element; and
 b) identifying the start of the message according to the first and second resource elements, and identifying the end of the message according to the third and fourth resource elements.

8. The method of claim 1, further comprising:
 a) determining, according to the first signal, a first I-branch amplitude and an orthogonal first Q-branch amplitude;
 b) determining, according to the first I and Q branch amplitudes, two amplitude modulation levels of a modulation scheme;
 c) determining, according to the second signal, a second I-branch amplitude and an orthogonal second Q-branch amplitude;
 d) determining, according to the first I and Q branch amplitudes and the second I and Q branch amplitudes, an amount of inter-subcarrier crosstalk; and
 e) determining, according to the amount of inter-subcarrier crosstalk, an amplitude correction factor.

9. The method of claim 8, further comprising:
a) receiving a message comprising message elements, each message element modulated according to the modulation scheme; and
b) for each message element, measuring a message I-branch amplitude and an orthogonal message Q-branch amplitude.

10. The method of claim 9, further comprising:
a) for each message element, determining at least one adjacent message element comprising an adjacent I-branch amplitude and an adjacent Q-branch amplitude; and
b) calculating, for each message element, an I-branch correction according to the amplitude correction factor and the adjacent I-branch amplitude, and a Q-branch correction according to the amplitude correction factor and the adjacent Q-branch amplitude.

11. The method of claim 10, further comprising:
a) for each message element, calculating a corrected I-branch amplitude by subtracting the I-branch correction from the message I-branch amplitude, and calculating a corrected Q-branch amplitude by subtracting the Q-branch correction from the message Q-branch amplitude;
b) comparing the corrected I-branch amplitude to a plurality of predetermined amplitude levels of the modulation scheme, and selecting the predetermined amplitude level closest to the corrected I-branch amplitude; and
c) demodulating the message element by comparing the corrected Q-branch amplitude to the plurality of predetermined amplitude levels of the modulation scheme, and selecting the predetermined amplitude level closest to the corrected Q-branch amplitude;
d) whereby the inter-subcarrier crosstalk is removed from the corrected I-branch amplitude and from the corrected Q-branch amplitude, according to the subtracting.

12. Non-transitory computer-readable media in a wireless transmitter, the media containing instructions that when implemented in a computing environment cause a method to be performed, the method comprising:
a) transmitting a first demodulation reference and a message, wherein:
i) the first demodulation reference is concatenated with a start of the message;
ii) the message and the first demodulation reference are modulated according to a modulation scheme comprising amplitude modulation;
iii) the amplitude modulation is according to a plurality of predetermined amplitude levels comprising a maximum amplitude level;
iv) the first demodulation reference comprises two demodulation resource elements; and
v) one of the demodulation resource elements comprises the maximum amplitude level of the plurality of predetermined amplitude levels, and the other demodulation resource element comprises zero transmission; and
b) transmitting a second demodulation reference, the second demodulation reference comprising a resource element comprising zero transmission, and a further resource element comprising the maximum amplitude level; and c) wherein the second demodulation reference is concatenated with an end of the message.

13. The media of claim 12, wherein:
a) the first demodulation reference, the message, and the second demodulation reference are transmitted in a particular sequence in time or in frequency; and
b) wherein the particular sequence comprises the maximum amplitude level, followed by zero transmission, followed by the message, followed by zero transmission, followed by the maximum amplitude level.

14. The media of claim 13, further comprising:
a) transmitting, before the first demodulation reference, a resource element comprising zero transmission; and
b) transmitting, after the second demodulation reference, another resource element comprising zero transmission;
c) whereby a receiver determines a background amplitude and a background phase according to a signal received during the resource elements with zero transmission.

15. A wireless receiver comprising an antenna and a processor, the receiver configured to:
a) receive, by the antenna, a demodulation reference comprising a first signal in a first resource element, followed by a second signal in a second resource element, wherein the first signal comprises transmission by a transmitter and the second signal comprises no transmission by the transmitter;
b) measure, by the processor, a first reference amplitude in a first portion of the first resource element, and a second reference amplitude, different from the first reference amplitude, in a second portion of the first resource element;
c) measure, by the processor, a first noise amplitude in a first portion of the second resource element, and a second noise amplitude in a second portion of the second resource element; and
d) determine, by the processor, an amplitude correction factor according to the first and second reference amplitudes and the first and second noise amplitudes.

16. The wireless receiver of claim 15, further configured to:
a) receive, by the antenna, a message comprising message elements;
b) for each message element, measure a first message amplitude followed by a second message amplitude;
c) for each message element, determine, by the processor, a first corrected amplitude by subtracting the amplitude correction factor from the first message amplitude, and determine, by the processor, a second corrected amplitude by subtracting the amplitude correction factor from the second message amplitude.

17. The wireless receiver of claim 16, further configured to:
a) determine, by the processor, according to the first and second reference amplitudes, a plurality of predetermined amplitude levels of a modulation scheme; and
b) demodulate, by the processor, each message element of the message by comparing the first and second corrected amplitudes to the plurality of predetermined amplitude levels.

* * * * *